United States Patent [19]

Jalas

[11] 4,253,586
[45] Mar. 3, 1981

[54] PNEUMATIC PLANTER HAVING CONTROLLED MOVABLE NOZZLE

[76] Inventor: Leon C. Jalas, R.R., Sutherland, Iowa 51058

[21] Appl. No.: 797,477

[22] Filed: May 16, 1977

[51] Int. Cl.³ .......................................... B65G 53/58
[52] U.S. Cl. ..................................... 221/278; 111/34
[58] Field of Search ............... 221/278; 239/659, 654, 239/655; 111/34

[56] References Cited

U.S. PATENT DOCUMENTS

| | | | |
|---|---|---|---|
| 2,538,756 | 1/1951 | Braswell | 239/654 X |
| 3,059,935 | 10/1962 | Vissers | 239/659 |
| 3,298,696 | 1/1967 | Vissers | 239/659 |
| 3,730,395 | 5/1973 | Gallogly et al. | 239/655 X |
| 3,964,639 | 6/1976 | Norris et al. | 221/278 |

Primary Examiner—Stanley H. Tollberg
Attorney, Agent, or Firm—Lucas J. De Koster

[57] ABSTRACT

A device for planting of agricultural seeds extremely rapidly and particularly adaptable to airborne planting including a tank-like device for holding seeds and for containing compressed air. Various types of devices are provided to align the seeds and insert them into a movable nozzle from which the compressed air shoots the seed into the ground.

2 Claims, No Drawings

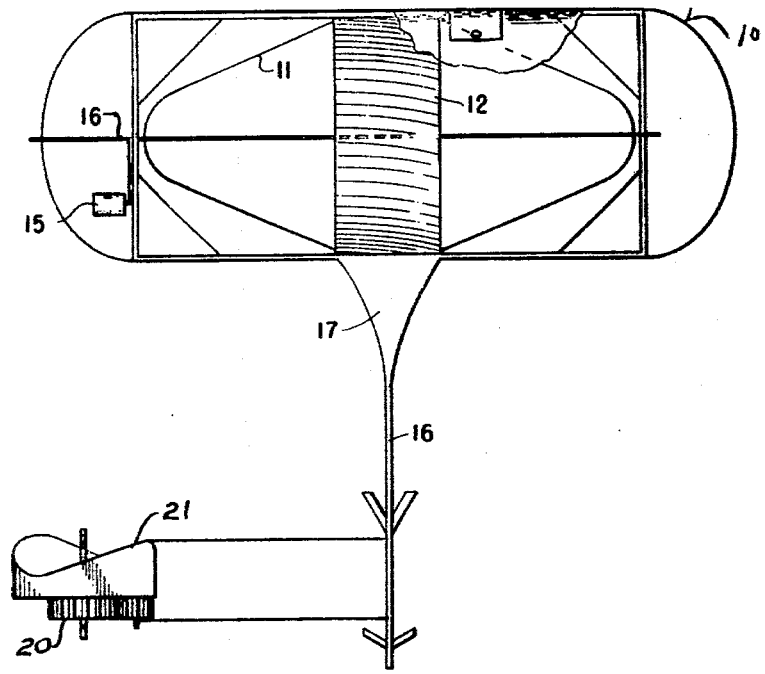

U.S. Patent  Mar. 3, 1981  Sheet 2 of 3  4,253,586

PNEUMATIC PLANTER HAVING CONTROLLED MOVABLE NOZZLE

BACKGROUND AND SUMMARY OF THE INVENTION

This application is a continuation in part of applicant's previous application, Ser. No. 666,741, filed Mar. 25, 1976 now U.S. Pat. No. 4,029,238, and is principally concerned with the use of a movable, controllable nozzle for a pneumatic planter.

The recent increase in productivity of the agricultural community has largely been made possible by the development of larger and more efficient and effective production machinery. Some of the increase has been accomplished simply by increases in size. For example, a row-crop harvester which once was useful to harvest two rows of grain is expanded to harvest four or six rows. But other—and often greater advances have been accomplished by a change of methods of operation. My invention falls into the latter class.

For many years, certain crops such as field corn and soybeans have been planted in rows by means of a planter rolling on the ground and injecting one or more seeds into the ground at periodic intervals timed by the rotation of one of the wheels. Multiple-row planters are simply the multiplication of the system.

The old system works reasonably well. The width of the row spacing can be varied—although somewhat clumsily in most equipment—by moving the individual planter devices closer together or farther apart. However, one big disadvantage is that often in the spring the soil is not dry enough to support the tractor and planter without a great deal of packing together and without the tractor wheels picking up great clumps of mud, and the other attendant problems of too moist earth. At such times, planting is often delayed until a date so late that maturity before frost in the northern latitudes becomes a problem.

My device, by its adaptation to being airborne by helicopter or airplane, will avoid the moisture problem. Further, my device can inject seeds into the soil at an extremely fast rate so that large fields can be planted very rapidly, again increasing the productivity. By the use of a controllable, movable nozzle for injecting the seed, it is possible to sow the seeds over a reasonably wide area and to provide for the use of the device in seeding row crops, or at least in planting the seeds fairly reasonably in rows.

FIGURES

FIG. 1 is a partially diagramatic view of my device using a rotating cylinder to move the seeds into position, FIG. 2 is a detailed partial view of the rotating cylinder apart from the device, FIG. 3 is a sectional detailed view of another type of device adapted to place the seeds in the nozzle, FIG. 4 is a detailed plan view of the rotating plates of the device of FIG. 3, FIG. 5 is a sectional view of a single stage aspirator nozzle used to shoot the seed, FIG. 6 is a view similar to FIG. 5 of a nozzle using two stages of aspiration to achieve greater velocity, FIG. 7 is a diagramatic view of the means to move the nozzle to direct the seed to the chosen location, FIG. 8 is a medial longitudinal sectional view of another embodiment of my invention, FIG. 9 is a sectional view along line 9—9 of FIG. 8, FIG. 10 is a view similar to FIG. 8 of a third embodiment, and FIG. 11 is a view from line 11—11 of FIG. 10.

DESCRIPTION

Briefly my invention comprises a device particularly adapted to airborne planting including a tank adapted to contain compressed air as well as the seeds. The seeds are conducted by means within the tank to a nozzle from which the compressed air ejects the seeds with considerable velocity whereby the seed is injected into the soil. Means is also provided to move the nozzle rhythmically so that the seeds will be planted in the proper pattern of rows.

More specifically and referring to the drawings, I provide a tank 10 adapted to be pressurized and to withstand a substantial pressure so that compressed air may be stored therein. Within the tank may be journalled a container 11 adapted to hold seeds and formed with a cylindrical center portion or belt 12. As best shown in FIG. 2, this center portion is slotted with a series of diagonal slots 13. The width of the slots should be such that a seed of the grain to be planted will fall readily into the slot, but the slot should not be wide enough to allow two seeds side by side across the width of the slot.

A small hydraulic or electric motor 15 may be enclosed in the tank 10. This motor is in driving relationship with the container 11 by means of gears or belt and pulley arrangement so that the container can be rotated about its axis 16.

A spout 17 extends from the tank 10 in the region of the belt 12. This spout is preferably relatively flat in one dimension and somewhat funnel shaped (as shown) in the other. A nozzle 18 is attached to the spout 17 in such a way that it can be moved modest distances in all radial directions. Thus it could be moved in all directions except longitudinally of the nozzle.

In order to achieve proper pattern of the seed on the ground, it is necessary to move the nozzle 18 in certain positive movements, rhythmically and under control. The controlled motion may be imposed on the nozzle either by crank means, wheel means or other cyclic gear means 20 or by a cam and follower means 21, or by a combination of these means. The wheel 20 and the cam and follower 21 devices are shown only diagramatically in FIG. 1 and FIG. 7 because the specific forms must be varied for different applications and because the variations are well within the abilities of anyone skilled in the art.

In operation, the seeds are placed in the container 11. The tank 10 is then pressurized. As the container 11 is rotated by the motor 15, the seeds fall into the slots 13 and are carried past the spout 17. The spiral or diagonal nature of the slots 13 allows the seeds to fall singly, but in rapid succession into the spout 17 and toward the nozzle 18. As the seed enters the nozzle 18, the rush of the compressed air through the nozzle picks up the seed and accelerates it to a high velocity. The seed is then shot out of the nozzle and directed toward the ground where it will impinge on the ground with such speed that it will be embedded in the earth sufficiently deeply that it can take root and grow. The nozzle 18 is moved under control of the motion devices 20 and 21 so that it will aim the seed at laterally spaced rows on the ground.

Such spacing is highly desirable so that row-type harvesting machines may be used.

Figure 1:
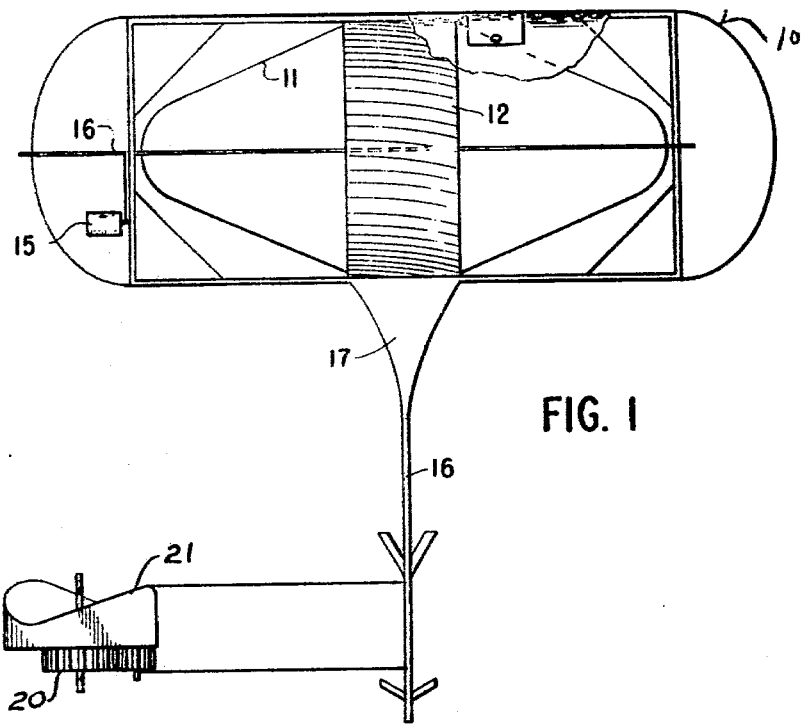
Figure 4:
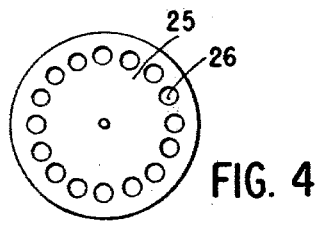
Figure 3:
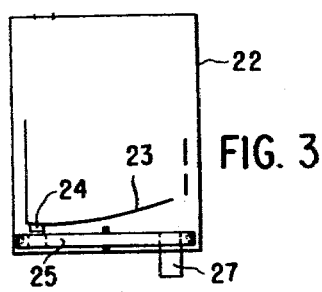
Figure 2:
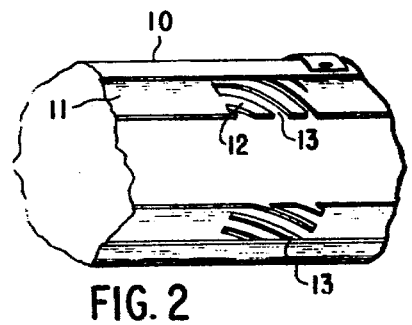

An alternative means for organizing the seeds so that they will be dropped singly into the spout 17 is illustrated in FIGS. 3 and 4. Here the container 22 is in the form of an upright cylindrical drum having a sloping false bottom 23. This bottom slopes to a discharge opening 24 through which the seeds drop onto a rotating plate 25. The plate 25 is formed with holes 26 large enough to receive individual seeds and carry them to a location where the hole 26 is in register with a discharge tube 27 through which the seed may be carried to the nozzle 18.

Figure 5:
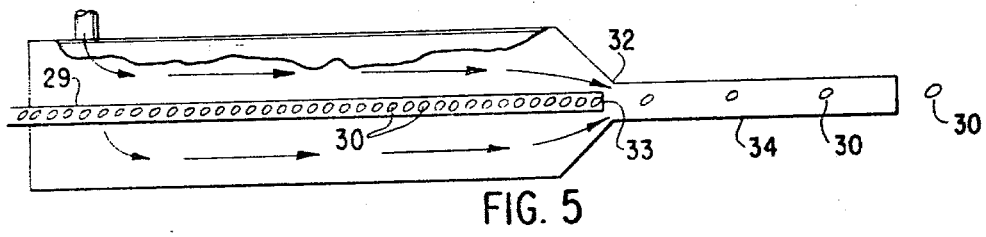
Figure 6:
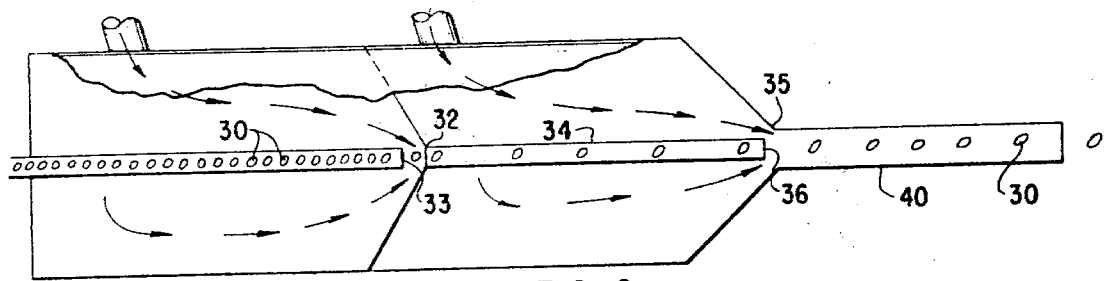
Figure 7:
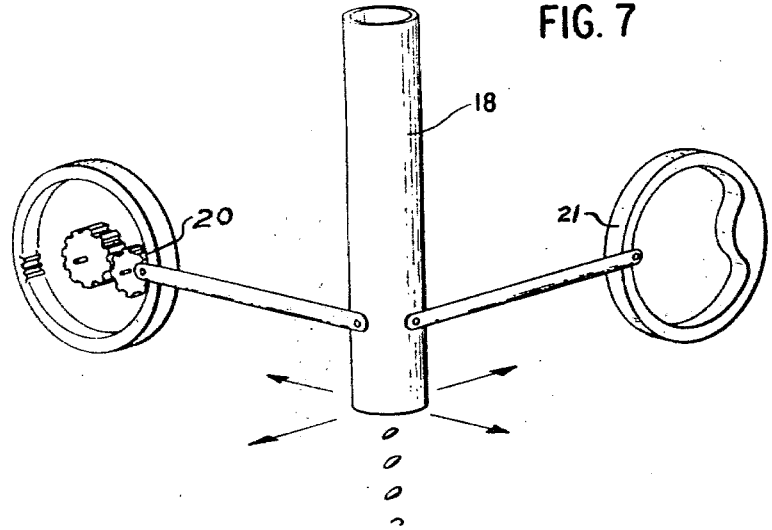

One of the key requirements of my device is that the seed be rapidly accelerated in the nozzle to a high velocity. In FIGS. 5 and 6, I illustrate some refinements in the nozzle mechanism designed to assure that velocity. In FIG. 5 I show a nozzle 29 similar to the nozzle 18. The seeds 30 are moved down this nozzle by the pressure of the air in the tank 10. However, in order to achieve greater acceleration, I provide for an aspirator type device consisting of a second annular nozzle 32 by which the air is directed in a narrow and very rapid stream past the outlet 33 of the tube 29. The aspiration effect of this stream picks up the seed and accelerates it through the outlet tube 34 at even higher velocity than it had in the tube 29.

The aspirating devices can be used in multiple stages as shown in FIG. 6. Where a second stage is simply added to the first. This second stage consists of a near duplication of the first, having another annular outlet 35 surrounding the discharge end 36 of the tube 34 and then a final nozzle tube 40 to aim the seed. Thus, the seeds can be brought up to proper discharge velocity so that they will be embedded adequately.

Figure 8:
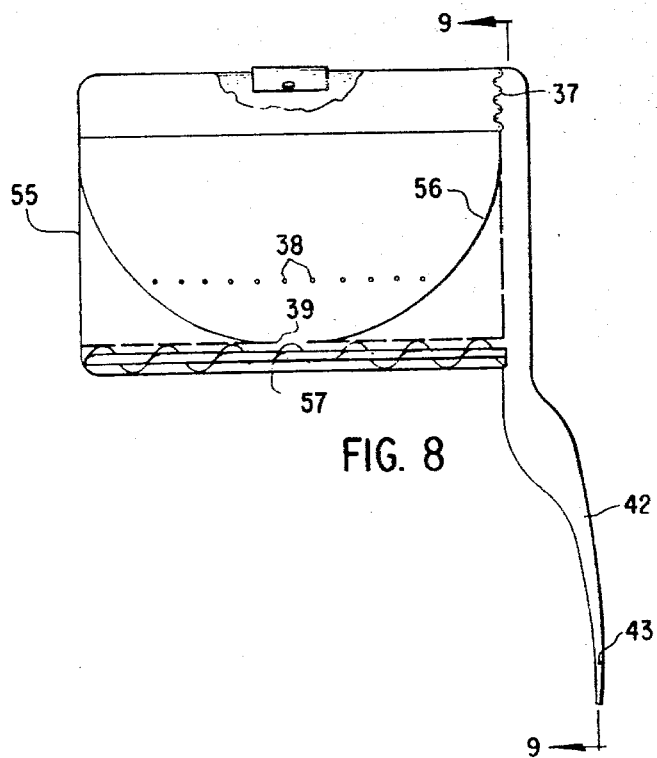
Figure 9:
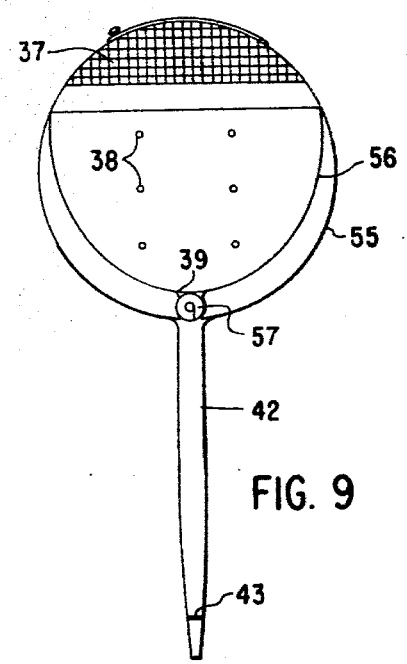

The second embodiment of my invention, as shown in FIGS. 8 and 9 also utilizes a pressurized tank 55. The seeds are carried in an inner container 56 having sloping sides, and vented to the tank by means of a screen 37, or holes 38 in the container or both. At the base of the container 56 is an opening 39 through which the seeds may drop into an auger device 57. The auger may be driven by an electric motor or hydraulic motor or other means not shown. The seeds which fall into the auger are then carried to a nozzle 42 of any type. The type shown is a simple nozzle depending solely on pressure in the tank for its accelerating force. With this type of device, it may be desirable to use a small brush 43 extending into the nozzle to keep the seeds dropping through the nozzle singly instead of in bunches.

Figure 10:
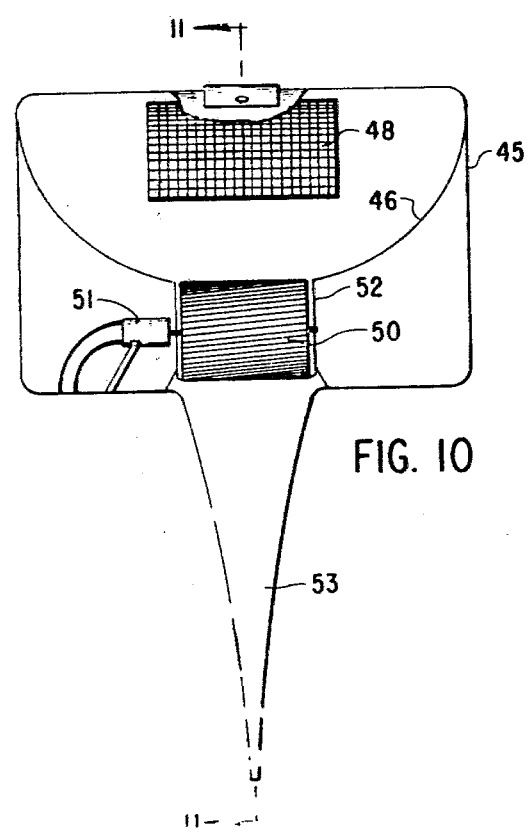
Figure 11:
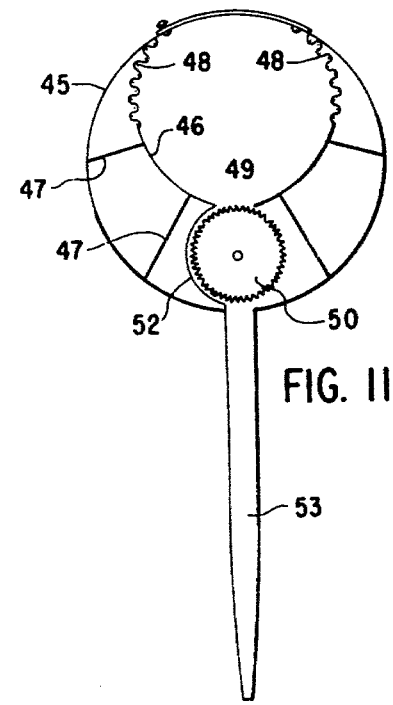

A third embodiment is illustrated in FIGS. 10 and 11 in which the pressurized tank 45 also encloses an inner seed container 46 which may be supported on legs or fins 47 in the tank. This inner container is also vented to the tank by a screen 48. At the base of this container is also an opening 49 through which seeds can drop onto a carrier 50. The carrier 50 is formed somewhat like a helical gear having teeth arranged in a spiral about the circumference, thereby forming helical grooves between the teeth adapted to carry the desired seeds. The angle of the helix can be varied according to the rate of feed desired.

The carrier may be rotated by means of an electric or hydraulic motor or the like 51. As it rotates, the grooves pick up the seed from the tank. A shield 52 is placed to hold the seeds in the grooves as the carrier rotates, until the seed is carried to a location adjacent a nozzle 53 through which the seed is accelerated to be shot into the earth. Again, it will be obvious that aspirator nozzles or a movable nozzle may be used.

It will be obvious that my device can be mounted on a land supported carriage. However, the real advantage is achieved because it can also be carried in an aircraft. It will also be obvious that any means of moving the seed rapidly to the nozzle may be used. Because of the rapid repetition of the seed shooting process, the device can be moved over the ground at a very rapid rate and still do an adequate job of planting. It is possible for the nozzle moving devices 20 and 21 to be designed to achieve a square-toothed saw tooth pattern on the ground as the carrying device moves forward. However, even with a simple wave pattern the seeds can be planted in properly spaced rows, and ordinary chemical applying and harvesting machinery adapted for row crops can be used. Thus, I can achieve extremely high speed planting without regard to some degree of excess moisture in the ground at planting time.

I claim:

1. Seed planting means comprising seed container means having an outlet, means in said container to bring seed individually to said outlet in rapid succession, nozzle means leading from said outlet through which said seeds are accelerated and from which they are discharged, said nozzle means being movable in all directions except axially thereof and motion inducing means attached to said nozzle to control the motion thereof, said motion inducing means including cam and follower means adapted to move said nozzle in a "saw-tooth" pattern to provide for substantially row-crop planting.

2. The device of claim 1 in which said motion inducing means also includes a crank means supplementing said cam and follower means.

* * * * *